United States Patent
Pedrotti et al.

(10) Patent No.: US 10,422,994 B1
(45) Date of Patent: *Sep. 24, 2019

(54) METHOD AND APPARATUS FOR MULTIPLE USER SELF-RELATIVE TRACKING USING MAGNETIC TRACKING

(71) Applicant: Sixense Enterprises Inc., Los Gatos, CA (US)

(72) Inventors: Owen Walter Pedrotti, Daly City, CA (US); Oded Y. Zur, Kochev-Yair (IL); Alejandro Santiago Diaz, Ross, CA (US); Amir Rubin, Los Gatos, CA (US)

(73) Assignee: Sixense Enterprises Inc., Los Gatos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/388,739

(22) Filed: Apr. 18, 2019

Related U.S. Application Data

(63) Continuation of application No. 16/203,512, filed on Nov. 28, 2018, which is a continuation of application (Continued)

(51) Int. Cl.
*G09G 5/00* (2006.01)
*G02B 27/01* (2006.01)
*G06K 9/00* (2006.01)

(52) U.S. Cl.
CPC ..... *G02B 27/0149* (2013.01); *G02B 27/0101* (2013.01); *G02B 2027/014* (2013.01); *G02B 2027/0163* (2013.01); *G06K 9/00335* (2013.01)

(58) Field of Classification Search
CPC ......... G06F 3/012; G06F 3/013; G06F 3/011; G06F 3/0346; G06F 3/017; G06F 3/04815; G06F 3/0482; G06F 1/163; G06F 3/014; G02B 27/0149; G02B 27/0101; G02B 2027/014; G02B 2027/0163;
(Continued)

(56) References Cited

U.S. PATENT DOCUMENTS 5,588,139 A * 12/1996 Lanier ............... G06F 3/011
703/1
5,812,257 A * 9/1998 Teitel ............... G01S 7/06
342/463

(Continued)

*Primary Examiner* — Duc Q Dinh
(74) *Attorney, Agent, or Firm* — Gard & Kaslow LLP

(57) ABSTRACT

A method and apparatus for self-relative body tracking in virtual reality systems using magnetic tracking is disclosed, which allows more accurate tracking of a user's body relative to the user's field of vision. A head-mounted magnetic tracking (HMMT) system is used, in which other parts of a user's body are tracked relative to the HMD on the user's head, rather than relative to a base station. This results in less distortion of the magnetic field used for tracking and thus allows for more accurate determination of the position and orientation of a user's body parts relative to the user's field of vision, so that a more accurate avatar may be presented on the HMD to the user. This allows the avatar of the user's body part to be shown in a location that corresponds closely to its physical position. In an alternative embodiment, multiple portions of the user's body may be tracked.

13 Claims, 4 Drawing Sheets

Related U.S. Application Data

No. 14/797,734, filed on Jul. 13, 2015, now Pat. No. 10,162,177.

(60) Provisional application No. 62/023,756, filed on Jul. 11, 2014.

(58) Field of Classification Search
CPC ........ G06K 9/00335; A61B 2034/2051; A61B 2090/365; A61B 5/061; A61B 2090/502; A61B 5/1114
USPC .......................................................... 345/7–9
See application file for complete search history.

(56) References Cited

U.S. PATENT DOCUMENTS

| | | | | |
|---|---|---|---|---|
| 6,172,657 B1 * | 1/2001 | Kamakura | ........... | G02B 27/017 345/8 |
| 7,710,395 B2 * | 5/2010 | Rodgers | ................. | G06F 3/012 345/157 |

\* cited by examiner

METHOD AND APPARATUS FOR MULTIPLE USER SELF-RELATIVE TRACKING USING MAGNETIC TRACKING

This application claims priority to Nonprovisional patent application Ser. No. 16/203,512, filed Nov. 28, 2018, which claims priority to Nonprovisional patent application Ser. No. 14/797,734, filed Jul. 13, 2015, now issued as U.S. Pat. No. 10,162,177, which claims priority to Provisional Application No. 62/023,756, filed Jul. 11, 2014, each of which is incorporated by reference herein in its entirety.

FIELD OF THE INVENTION

The present invention relates generally to virtual reality devices, and more particularly to trackers for use in a virtual reality context.

BACKGROUND OF THE INVENTION

Virtual reality is often used to describe a wide variety of applications commonly associated with immersive, highly visual, computer-simulated environments that can simulate a user's physical presence in places in the real world or imagined worlds. While virtual reality can recreate a number of sensory experiences, the senses most commonly used today to create virtual reality appear to be sight and sound.

One method of presenting a virtual world to a user that is commonly identified with virtual reality and presently in use is through the use of a visor or helmet containing a video display which encompasses part or all of a user's field of view and presents computer generated images representing the virtual reality environment, or "virtual world," to the user. Such a device is often referred to as a head-mounted display, or HMD. One type of HMD presently available is the Oculus Rift from Oculus VR, now owned by Facebook.

Typically a HMD covers the user's eyes, so that the user sees only the virtual world while wearing the HMD and is thus unable to see the actual physical world around the user while in the virtual world. In the physical world a person is normally able to see his or her arms, legs and torso when they are within the person's field of vision, but a user of a HMD which covers the entire field of the user's vision is unable to do so. To enhance the realism of the virtual world, in some cases it is thus desirable that the user see in the virtual world an avatar of a body, or at least some portions thereof, which correspond to the user's physical sensations of his or her own body.

In some systems, such an avatar may be created by displaying virtual body parts such as arms, legs and torso in a position and orientation similar to how such body parts might ordinarily appear in the user's field of vision in the physical world. In order to display such virtual body parts in locations that at least approximate where the user's body parts are physically located, it is desirable to know the position and orientation of such parts of the user's body. The more precisely the actual physical position and orientation of a user's body part relative to the user's field of vision may be determined, the more accurately a virtual world avatar of a user may be portrayed in the user's field of vision on an HMD.

One known way of determining the position and orientation of a user's head is by attaching to the HMD a tracker which is able to sense a magnetic field generated from a local base station, video game console or other apparatus. The tracker provides information about the sensed magnetic field to a processor, which derives the position and orientation of the tracker, and thus the HMD, relative to the base station from such information.

It is also known to place such a tracker in a handheld controller, or to attach it to one or more of the user's limbs, which similarly allows the position and orientation of the controller or limbs to be derived by the processor. The processor may then extrapolate the position of the user's hand holding the controller from the position of the controller, and display an avatar of the user's hand to the user on the HMD based upon such extrapolation.

However, there are a number of factors that limit the accuracy of base station type systems. The strength of the magnetic field between a tracker and a base station suffers from attenuation over distance, which decreases accuracy in the detection of the magnetic field by the tracker. Objects located between the tracker and the base station may cause distortion in the magnetic field, particularly if those objects contain ferrous materials. Conducting surfaces in the environment may also contain eddy currents induced by the source magnetic field which in turn generate secondary magnetic fields that interfere with the ability of sensors to detect the source magnetic field. Still further, if a tracker is located on a handheld controller, the extrapolation of the position of the user's hand may be inaccurate, as the position of the tracker on the handheld controller may not precisely correspond to the position of the user's hand depending upon the size of the controller and where on the controller the tracker is located.

Thus, a base station type system may not be able to track desired portions of a user's body with sufficient accuracy to generate an avatar of those portions of the body in their precise positions relative to the user's field of vision such that the user sees the avatar of his or her body portions to be in the same locations in which they are physically felt by the user.

SUMMARY OF THE INVENTION

A system and method is disclosed which provides for self-relative body tracking in virtual reality systems using magnetic tracking.

One embodiment discloses a system for use with a head-mounted display (HMD), the HMD covering a user's field of vision, comprising: a magnetic tracking system comprising a plurality of source magnetic coils configured to generate a magnetic field and a plurality of sensor magnetic coils configured to sense the magnetic field, one of the pluralities of magnetic coils configured to be attached to the HMD and the other plurality of magnetic coils configured to be attached to a limb of the user; and a processor configured to: generate and output instructions to the HMD to display on the HMD a virtual world; determine the position and orientation of the users' limb relative to the HMD using information from the magnetic tracking system; and generate and output instructions to the HMD to display on the HMD a virtual limb in the virtual world, the virtual limb in an apparent position and orientation corresponding to the actual physical position and orientation of the user's limb.

Another embodiment discloses a method of providing an avatar of the body of a user wearing a head-mounted display (HMD) to the user, the HMD covering the user's field of vision, the method comprising: attaching two pluralities of magnetic coils to the user, one plurality of coils to the HMD and the other plurality of magnetic coils to a limb of the user; generating a magnetic field from one of the pluralities of magnetic coils; generating magnetic sensor data by sensing the magnetic field using the other plurality of coils; generating and outputting, by a processor, instructions to the HMD to display on the HMD a virtual world; determining, by the processor, the position and orientation of the user's limb relative to the HMD using the magnetic sensor data; and generating and outputting, by the processor, instructions to the HMD to display on the HMD a virtual limb in the virtual world, the virtual limb in an apparent position and orientation corresponding to actual physical position and orientation of the user's limb.

Still another embodiment discloses a non-transitory computer-readable medium having embodied thereon instructions for causing a computing device to execute a method of providing an avatar of the body of a user wearing a head-mounted display (HMD) to the user, the HMD covering the user's field of vision, the method comprising: attaching two pluralities of magnetic coils to the user, one plurality of coils to the HMD and the other plurality of magnetic coils to a limb of the user; generating a magnetic field from one of the pluralities of magnetic coils; generating magnetic sensor data by sensing the magnetic field using the other plurality of coils; generating and outputting, by a processor, instructions to the HMD to display on the HMD a virtual world; determining, by the processor, the position and orientation of the user's limb relative to the HMD using the magnetic sensor data; and generating and outputting, by the processor, instructions to the HMD to display on the HMD a virtual limb in the virtual world, the virtual limb in an apparent position and orientation corresponding to actual physical position and orientation of the user's limb.

A further embodiment discloses a system for capturing the motion of a limb of a user relative to the user's torso, comprising: a magnetic tracking system comprising a plurality of source magnetic coils configured to generate a magnetic field and a plurality of sensor magnetic coils configured to sense the magnetic field, one of the pluralities of magnetic coils configured to be attached to the user's torso and the other plurality of magnetic coils configured to be attached to a limb of the user; and a processor configured to determine the position and orientation of the user's limb relative to the user's torso using information from the magnetic tracking system.

Another embodiment discloses a system for displaying the motion of first user to a second user, comprising: a magnetic tracking system comprising a plurality of source magnetic coils configured to generate a magnetic field and a plurality of sensor magnetic coils configured to sense the magnetic field, one of the pluralities of magnetic coils configured to be attached to the first user's torso and the other plurality of magnetic coils configured to be attached to a limb of the first user; and a processor configured to: determine the position and orientation of the first user's limb relative to the first user's torso using information from the magnetic tracking system; and generate and output instructions to display to the second user on a display device an avatar of the first user, the avatar of the first user having a virtual torso and a virtual limb in an apparent relative position and orientation corresponding to the actual relative physical position and orientation of the first user's torso and limb.

A further embodiment discloses a system for use with an augmented reality display (ARD), the ARD overlaying a user's field of vision, comprising: a magnetic tracking system comprising a plurality of source magnetic coils configured to generate a magnetic field and a plurality of sensor magnetic coils configured to sense the magnetic field, one of the pluralities of magnetic coils configured to be attached to the ARD and the other plurality of magnetic coils configured to be attached to a physical object; and a processor configured to: determine the position and orientation of the physical object relative to the ARD using information from the magnetic tracking system; and generate and output instructions to the ARD to display information on the ARD based upon the position and orientation of the physical object.

DETAILED DESCRIPTION OF THE INVENTION

Figure 1:
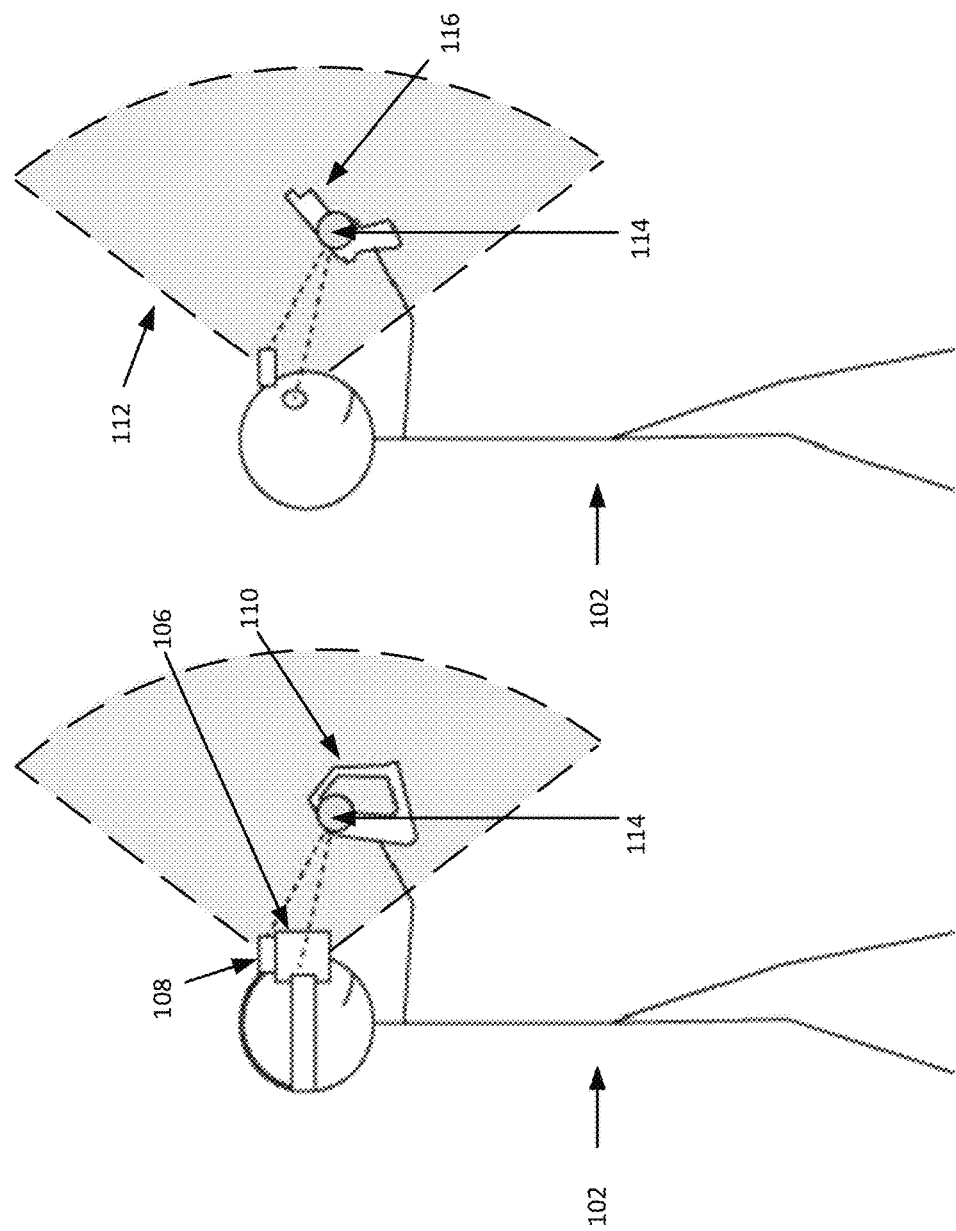
FIGS. 1A and 1B are illustrations of a user wearing a head mounted display (HMD).

A method and apparatus for self-relative body tracking in virtual reality systems using magnetic tracking is disclosed, which allows more accurate tracking of a user's body relative to the user's field of vision. A head-mounted magnetic tracking (HMMT) system is used, in which other parts of a user's body are tracked relative to the HMD on the user's head, rather than relative to a base station. This results in less distortion of the magnetic field used for tracking and thus allows for more accurate determination of the position and orientation of a user's body parts relative to the user's field of vision, so that a more accurate avatar may be presented on the HMD to the user.

In one embodiment, in a system or method for use with a HMD, a magnetic field source comprising a plurality of source magnetic coils which generate a magnetic field is attached to the HMD on the user's head, and a tracker comprising a plurality of sensor magnetic coils which sense that magnetic field is attached to a limb of the user. As is known in the art, a processor uses data from the tracker to determine the relative position of the user's limb and the HMD, and generates an avatar of the user's limb that is displayed on the HMD.

The closeness of the magnetic field source and the tracker allows for more accurate determination of the position and orientation of the tracker. This in turn allows the avatar of the user's limb to be shown in a location that corresponds very closely to the physical position of the user's limb, so that the user sees his or her limb in the virtual world in a position that is close to the position in which the user feels the limb to be.

In an alternative embodiment, there may be multiple pluralities of sensor coils, each plurality of sensor coils located on a different portion of the user's body. For example, there may be separate sensor coils on each hand of the user, and each foot. In some cases it may even be desirable to have a plurality of sensor coils located on the user's torso. The processor may then generate an avatar to be displayed on the HMD, which each limb (or the torso) of the avatar shown in a position corresponding to the actual physical position of the user's actual limb.

FIG. 1A shows a user 102 in the real world wearing a HMD 106; HMD 106 covers the user's eyes and presents the user with a representation of a virtual world, while preventing the user from seeing the real, or physical, world.

Attached to or incorporated in the HMD 106 is a magnetic field source 108 comprising a plurality of source magnetic coils, which generates a magnetic field.

FIG. 1A also shows the user 102 holding a controller 110 which the user may pick up with his or her hand(s), and which allows the user to perform various functions in the virtual world. Various devices suitable for use as controller 110 will also be known to those of skill in the art. The controller 110 is considered to be attached to the user's hand when the user holds it.

Attached to controller 110 is also a tracker 114, comprising a plurality of sensor magnetic coils. The sensor magnetic coils in tracker 114 sense the magnetic field emanating from magnetic field source 108, and provide data about the sensed magnetic field from which a processor can derive the position and orientation of tracker 114 relative to the magnetic field source 108, and thus relative to the HMD 106. In embodiments, tracker 114 may be contained within the body of a controller 110. In still other embodiments, tracker 114 may be directly attached to the user's limb by means of, for example, a strap of elastic material or a hook and loop material such as Velcro. One of skill in the art will appreciate that there are other ways in which tracker 114 may be attached to a user as well.

Such trackers, and the processors which determine the position and orientation of such trackers, are well known to those of skill in the art. One such example, U.S. Pat. No. 4,737,794, teaches a "method and apparatus for determining remote object orientation and position with an electromagnetic coupling." It shows a plurality of radiating antennas located at a source to provide a plurality of electromagnetic fields spanning three dimensional space and defining a source reference coordinate frame, and a plurality of receiving antennas located on an object to be tracked for receiving that field. A processor receives the outputs from the receiving antennas and converts the received components of the transmitted electromagnetic fields into remote object position and orientation relative to the source reference coordinate frame. The antennas may be, for example, dipole antennas, loop antennas, or coil antennas.

Attaching magnetic field source 108 to HMD 106 allows for an exact known position and orientation offset between magnetic field source 108 and the display screen of HMD 106. By applying this offset to the measurements from tracker 114, the position and orientation of tracker 114 relative to the display screen of HMD 106 can also be determined with great accuracy, and thus where tracker 114, and the user's hand, is within the user's field of view.

The positions of the magnetic field source 108 and tracker 114 in FIG. 1A may be reversed if desired for convenience, i.e., magnetic field source 108 may be attached to the user's hand and tracker 114 attached to HMD 106. What is important is that one of magnetic field source 108 and tracker 114 is located on HMD 106 and the other on a part of the user's body so as to track the relative position of HMD 106 and the user's body part.

FIG. 1B is a representation of the user 102 of FIG. 1A as the user 102 sees the virtual world, showing the field of view 112 that may be presented to the user by the HMD 106. As will be known to those of skill in the art, a processor (not shown) generates instructions that cause HMD 106 to present a view to user 102 that is appropriate given the position and orientation of user 102's head and any actions taken with controller 110, so that what is within field of view 112 will change as user 102 moves his or her head and uses controller 110.

In the illustration of FIG. 1B, the user is seeing the virtual world as presented on HMD 106. In FIG. 1B the user also sees a virtual object 116 in his or her hand, here a virtual gun, rather than the controller 110 that the user is actually holding as in FIG. 1A. The user has presumably used the controller to interact with the virtual world to "pick up" the virtual gun 116. Tracker 114 remains on controller 110 but in some embodiments will not be visible in the virtual world.

Tracker 114 is attached to controller 110, and thus magnetic field source 108 is closer to tracker 114 than a base station would typically be. For this reason, tracker 114 may sense the magnetic field more accurately than it would be likely to sense the magnetic field from a base station, and thus the determination of the position and orientation of tracker 114, and resultantly the user's hand, is likely to be more accurate than the case of a base station. In addition, the closeness of the magnetic field source 108 and tracker 114 make it likely that there will not be any objects between them, or any nearby surfaces which may contain eddy currents, which could interfere with the magnetic field.

The magnetic field source 108 may be attached to the HMD in a variety of ways and a variety of configurations, as long as the relative position and orientation between the magnetic field source 108 and the display screen of HMD 106 is fixed. In the case of the Oculus Rift, such a fixed relative position may be obtained by including in magnetic field source 108 a male USB plug which is inserted into a USB host port on top of the HMD. This also provides power and data to magnetic field source 108 and any wireless data channels to tracker 114.

Figure 2:
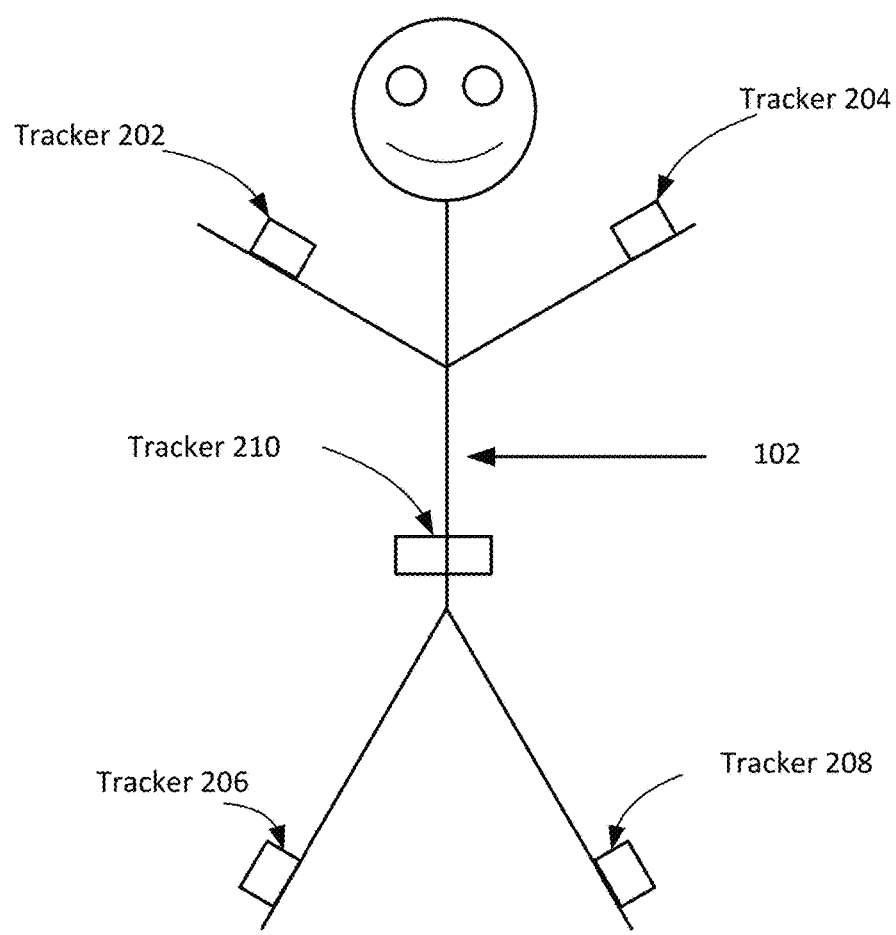
FIG. 2 is an illustration of a user wearing multiple trackers on the user's body.

In some embodiments, trackers may be placed on more locations on the body of a user, as shown in FIG. 2. As illustrated, user 102 now has five different trackers attached to various portions of the body. Tracker 202 is attached to the right hand or arm of user 102, tracker 204 to the left hand or arm, tracker 206 to the right foot or leg, tracker 208 to the left foot or leg, and tracker 210 to the waist or torso of user 102. User 102 again wears an HMD with a magnetic field source attached, such as HMD 106 and magnetic field source 108 of FIG. 1, although these are not shown in FIG. 2.

As with tracker 114 in FIG. 1, each of trackers 202, 204, 206, 208 and 210 in FIG. 2 senses the magnetic field from magnetic field source 108 attached to the HMD 106 worn by user 102. A processor, not shown, again determines the position and orientation of each tracker from data provided by the tracker about the sensed magnetic field. Again the trackers are close to the magnetic field source, so that the position and orientation of each tracker may be accurately determined.

More or fewer trackers may be utilized in various embodiments. The number of trackers which is desirable may depend upon the particular application that is being used and the virtual world to be presented on the HMD for that application. One of skill in the art will be able to make a determination of how many trackers are appropriate, and where on a user's body they should be located in order to create an appropriate avatar for the application.

As discussed above, the position of magnetic field source 108 may be switched with any one of trackers 202 to 210. Again, what is important is that one device of magnetic field source 108 and trackers 202 to 210 is attached to HMD 106, and the remaining devices are attached to parts of the user's body, so that the relative positions of HMD 106 and the user's body parts may be accurately determined. No matter how the user moves his or her head, all tracked hardware will visually appear to be in the correct location.

By mounting magnetic field source 108 and any trackers on either HMD 106 or the user's body, the distance between magnetic field source 106 and all of the trackers is bounded by the dimensions of the user's body. This limited distance reduces signal attenuation, and also the effects of any secondary magnetic fields in the vicinity of the user, resulting in increased accuracy.

As in the discussion above, the offset between magnetic field source 108 and the screen display of HMD 106 is applied to all of the trackers in use to determine their positions relative to the screen and thus where the body parts to which the trackers are attached lie in the user's field of vision. This offset between magnetic field source 108 and the screen display of HMD 106 can be pre-determined from the geometry of the mounting hardware that attaches magnetic field source 108 to HMD 106, or it may be measured and manually input by the user if a particular HMD 106 does not provide support for a fixed mount.

One way to pre-determine this offset would be to build magnetic field source 108 directly into HMD 106 that contains the display, so that the offset is determined by the physical design of the unit. The offset can alternatively be constrained by requiring the user to mount magnetic field source 108 to the head strap of HMD 106, or by providing a modular bracket that securely connects them. Magnetic field source 108 could also be attached to other worn accessories or devices that are placed on the head, such as headphones or a hat.

When magnetic field source 108 is attached by a rigid fixture to HMD 106, a calibration process can be implemented to measure the attenuation/amplification caused by HMD 108 in each ordination of the coil(s) of magnetic field source 108 to each of the operating frequencies, and a compensation matrix for this condition can be generated. The system will use this compensation matrix when magnetic field source 108 is attached to HMD 106 to mitigate any distortion caused by electrical components.

It may also be possible to isolate the contribution of HMD 108 to the signal biases from per-component variance that occur naturally from one coil to another to creating a model that can output a new set of coefficients that are correct for any combination of individual coils and any new HMD introduced to the market. This would allow end users to perform software updates to enable the tracking system to function optimally with new display hardware, without requiring additional per-coil calibration testing in a controlled environment.

It will be appreciated that because tracking is not performed relative to a base station which has a fixed position in the physical world, the absolute position of any trackers attached to the user's body are not fully determined by the HMMT. Rather, only the relative positions of the trackers and magnetic field source 108 are determined. If it is desirable to know the actual position of the HMD, the HMD, or the user's head, may be tracked relative to a fixed physical location, such as a base station, by a separate system.

If it is desired to know the absolute position of the user, or to reproduce some other physical object in the virtual world, such as a table or floor, in some embodiments a tracker may be placed on such an object, which can then also be used as a reference frame to determine the absolute position and orientation of magnetic field source 108 and thus the absolute position and orientation of the user's head. Alternatively, in some embodiments, the orientation of the user's head may be determined by the use of inertial sensors so that an appropriate orientation for the virtual world to be shown on screen display of HMD 106 may be selected.

As above, in the virtual world, the position and orientation of each tracker is used to determine the position and orientation of a corresponding virtual body part which is then shown in a visually correct position on the screen display of HMD 106. Thus, in FIG. 1 above, the position and orientation of user 102's hands is known from the position and orientation of tracker 114. However, the actual pose of the user's hands grasping controller 110 may not be the pose that it is desired to be displayed, i.e., the grip on controller 110 may not correspond to a grip that would normally be used on virtual object 116.

In this case, the pose of the user's hand to be displayed may be inferred based on how controller 110 is designed to be gripped using inverse kinematics. Inverse kinematics is a known technique for animating 3D characters in which a 3D model is posed like a mannequin in order to position a particular body part, such as a hand, at a desired location in space. The virtual hand may be located at a position in the virtual world corresponding to the position of the tracker on the user's physical hand, and the joints of the virtual hand rotated to approximate the pose in which the hand would be expected to be seen in a particular application, rather than the actual pose of the hand gripping controller 110.

Figure 3:
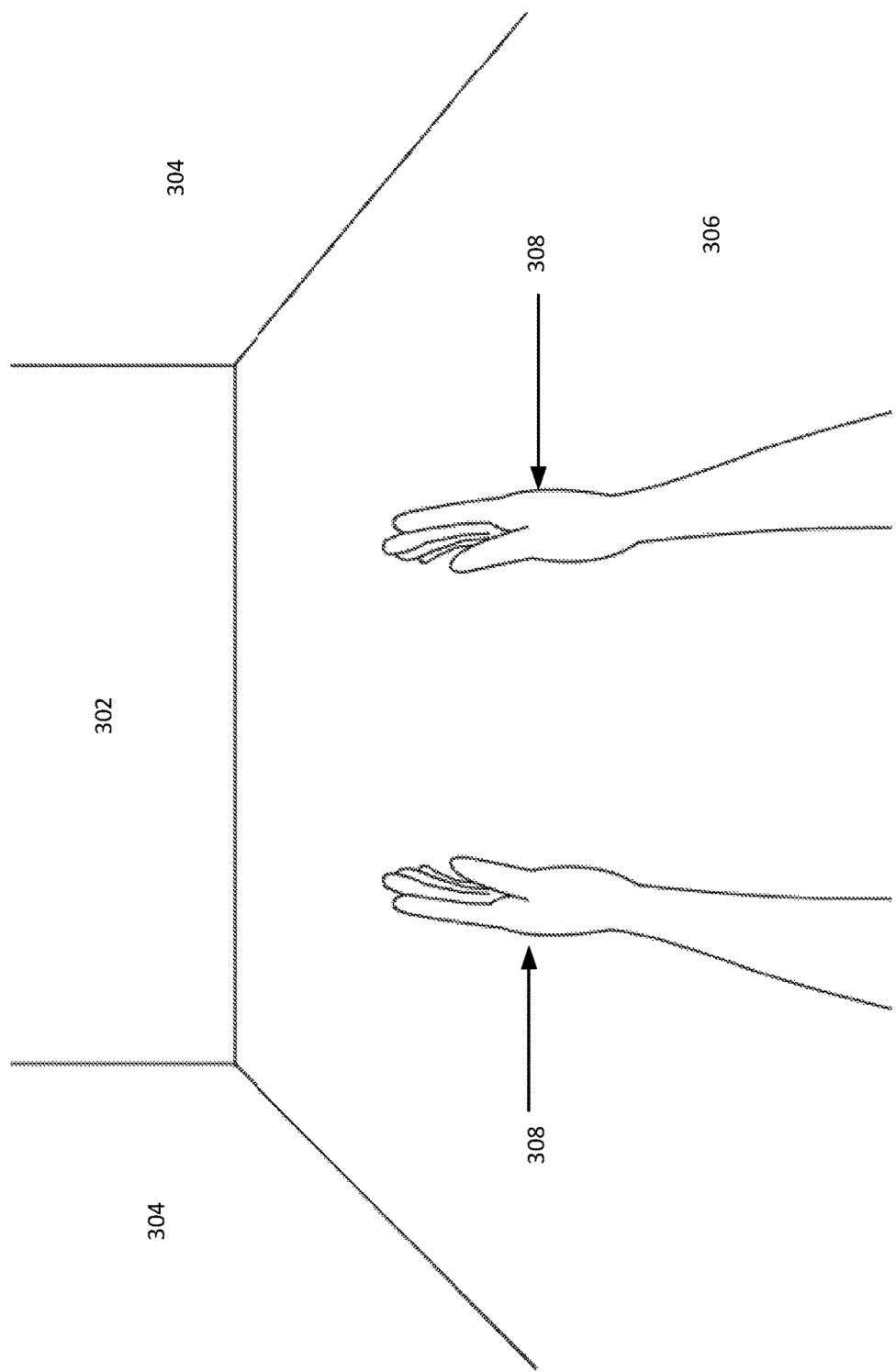
FIG. 3 is an illustration of a generated virtual world including avatars of a user's hands.

Thus, FIG. 3 shows one embodiment of what a user such as user 102 might see in the virtual world displayed in the HMD 106 in one embodiment. In the illustrated embodiment, the processor has generated instructions to the display of HMD 106 to create a picture of a virtual world as if the user is looking toward a back wall 302, and also displays side walls 304 and floor 306.

In FIG. 3 it is assumed that trackers are attached to the user's hands, and that the user's field of view of the virtual world includes a region corresponding to the region of the physical world in which the user's hands are physically located. (There may be other trackers attached, for example, to the user's legs or torso, but, if so, the user is not presently looking in the direction of his or her legs or torso.)

Since the processor is able to determine from information received from the trackers attached to the user's hands where the hands are located, the processor may display both virtual hands 308 in apparent locations within the virtual world that correspond to where the user's physical hands are actually located. This heightens the illusion of reality presented in the virtual world, as the user sees the avatar of his or her hands in a location corresponding to the location in which the user feels his or her actual physical hands to be, even though the user cannot actually see the physical hands through the HMD.

Even though the user 102 in FIG. 1 is actually gripping a controller 110, in FIG. 3 the virtual hands 308 are shown in an inferred pose, here open hands, rather than in a gripping pose.

The processor can continue to generate instructions to the display in the HMD to present the user with changes in the virtual world based upon actions that the user has performed with a controller, such as controller 110 in FIG. 1. In a conventional video game, for example, a user may use a controller to have a character on a television screen "pick up" a weapon displayed on the screen. Similarly, in a virtual reality setting the processor can cause a HMD to display a virtual weapon while the user is in a virtual world.

Then, upon the user's extending his or her physical hand(s) in such a way as to cause the corresponding virtual hand(s) to "reach for" the displayed virtual weapon and the user's activating a proper command (e.g., by pressing a button on the controller), the processor can cause the HMD to display the user's virtual hand(s) 308 as "picking up" and holding that virtual weapon. Virtual hands 308 may continue to be shown in an apparent location corresponding closely to the actual location of the user's hands with respect to the user's field of vision and in a position indicative of holding the weapon.

Figure 4:
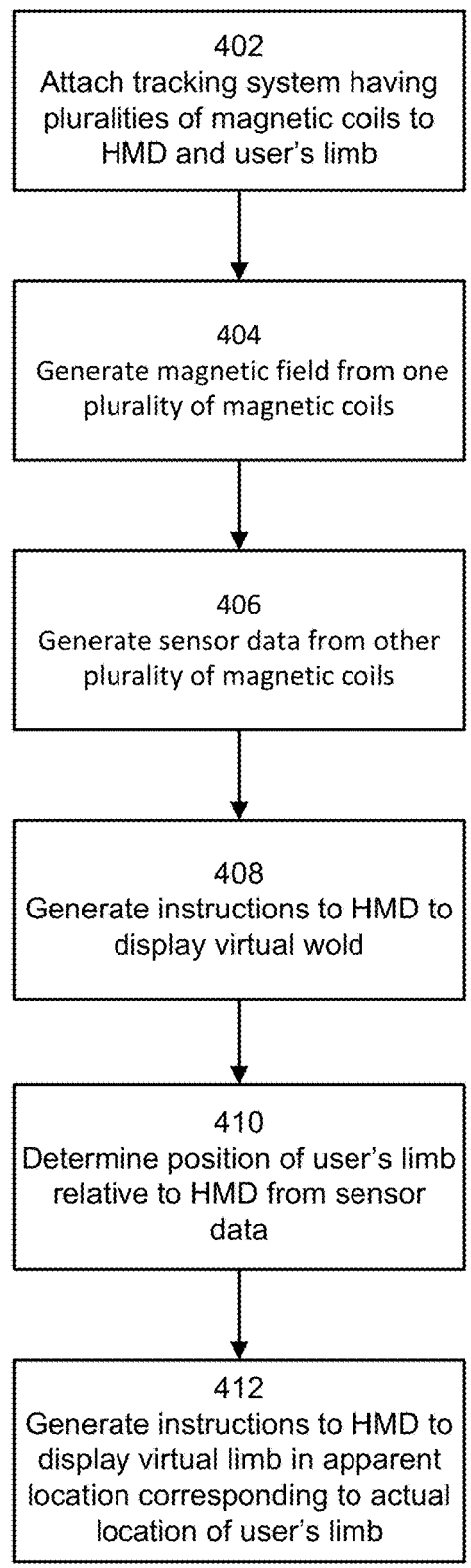
FIG. 4 is a flowchart of a method of generating an avatar of one or more of a user's body parts in a generated virtual world.

FIG. 4 is a flowchart of a method implemented by a processor that might result in the virtual world display(s) described herein according to one embodiment. It is assumed that, as above, a user wears a HMD having a display, a processor provides instructions that direct what appears on the display, and that there is a magnetic field source having magnetic coils configured to generate a magnetic field and a tracker having magnetic coils configured to sense the magnetic field and provide sensor data. It is also assumed that the processor is able to determine the position and orientation of the tracker relative to the magnetic field source from such sensor data.

At step 402, a magnetic tracking system comprising two pluralities of magnetic coils is attached to the user. As above, one plurality of magnetic coils is configured to generate a magnetic field and the other plurality of magnetic coils is configured to sense the magnetic field and generate sensor data. One plurality of magnetic coils is attached to the HMD, and the other plurality of magnetic coils is attached to a limb of the user.

As shown in FIG. 1 above, the magnetic coils that are configured to generate a magnetic field (magnetic source 108) are attached to the HMD 106, and the other magnetic coils that are configured to sense the magnetic field (tracker 114) are attached to the user's hand. Again, these positions may be reversed, so that the magnetic source 108 is attached to the user's hand and the tracker 114 is attached to the HMD 106 if desired.

At step 404, a magnetic field is generated from the plurality of magnetic coils that is configured to generate a magnetic field. While the magnetic field is generated, at step 406 sensor data is generated by and collected from the other plurality of magnetic coils.

At step 408, the processor generates and outputs instructions to the HMD to display on the HMD display a generated virtual world.

At step 410, the processor determines the position and orientation of the user's limb relative to the HMD from the sensor data.

Finally, at step 412, the processor generates and outputs instructions to the HMD to display on the HMD a virtual limb in an apparent position that corresponds to the actual physical location of the user's limb.

Also as discussed above, more than one tracker 114 may be used, with the additional trackers attached to other limbs or the torso of user 102 at step 402. In this case, each tracker will generate sensor data at step 406, and the processor will determine the position of each tracker relative to the HMD at step 410. Finally, the processor will generate instructions to display a virtual limb (or torso) corresponding to the actual physical position of each tracked limb or torso.

It will be apparent to one of skill in the art that some of these steps may be performed in a different order than specified, while others should be performed in order to obtain the desired effect. For example, the processor may determine the position and orientation of the tracker before generating and outputting the instructions to the HMD to display the generated virtual world. On the other hand, it will most likely not be appropriate to send the instructions that result in the HMD displaying the virtual hand before the position of the tracker on the user's physical hand has been determined.

Another possible application of the novel system and method described herein involves tracking of a user's body parts without the use of a HMD, and thus without display of an avatar of those body parts. By placing a magnetic field source and trackers on the limbs and torso of a user, the system may be used for generalized motion capture by determining the movement of the user's limbs relative to the torso.

Such motion capture may be used as input for games other than those that utilize a HMD, for recording performance or movements of a user to be used in 3D animation, for reactive user interfaces in graphical systems (such as was seen in the movie Minority Report), or any other field of human-computer interaction that could react to the user's body pose.

Another possible application of the described system and method is in combination with traditional base station-based systems. Such a combination allows users to benefit from both the highly accurate self-relative tracking of the present application as well as tracking relative to a fixed point (i.e., a base station) as in the prior art, while providing a mapping between the two frames of reference. This could, for example, allow multiple users to share a physical and virtual space at the same time, or allow positional tracking of a user relative to a fixed physical location such as a floor or room.

Yet another possible application is in augmented reality situations, in which the user is still able to see the physical world at least indirectly while some elements of the physical world are augmented or supplemented by computer-generated sensory input. By contrast with virtual reality, in which the user's perception of the physical world is largely or entirely replaced with a simulated one, in augmented reality one's perception of the physical world is not entirely replaced but rather "enhanced" with additional input.

In an augmented reality situation, a tracker may be attached to a physical object and then tracked with respect to the user's field of vision, making it possible to overlay computer generated graphics precisely on the tracked object, or alternatively to use the tracked object to interact with virtual objects displayed to the user.

The same tracking of body parts described above with respect to a virtual world displayed on a HMD may also be applied to augmented reality situations, without the need to render and display an avatar of the user. A user could thus interact with real physical objects and virtual objects simultaneously in the same space.

In yet another possible application, tracking of a user's body could also be used to animate an avatar, not to be shown to the user as above, but rather to be shown to a different user viewing a separate virtual world or an augmented reality, for use in, for example, telecommunications applications.

The disclosed system and method has been explained above with reference to several embodiments. Other embodiments will be apparent to those skilled in the art in light of this disclosure. Certain aspects of the described method and apparatus may readily be implemented using configurations or steps other than those described in the embodiments above, or in conjunction with elements other than or in addition to those described above. It will also be apparent that in some instances the order of steps described herein may be altered without changing the result of performance of all of the described steps.

There may be a single processor, or multiple processors performing different functions of the functions described herein. As above, a processor may be located in the HMD or elsewhere on the user's body, or even in a base station if desired. One of skill in the art will appreciate how to determine which and how many processors will be appropriate for a specific intended application. Instructions for performing the methods herein on a processor may be stored on a non-transitory computer-readable storage medium.

These and other variations upon the embodiments are intended to be covered by the present disclosure, which is limited only by the appended claims.

What is claimed is:

1. A self-relative tracking system for use with two head-mounted displays (HMDs), a first of the two HMDs covering a first user's field of vision, the first HMD including a first HMD tracking system for determining an absolute position and orientation of the first HMD relative to a fixed position in the physical world, and a second of the two HMDs covering a second user's field of vision, the second HMD including a second HMD tracking system for determining an absolute position and orientation of the second HMD relative to the fixed position in the physical world, the self-relative tracking system comprising:
   a first magnetic tracking system comprising a first plurality of source magnetic coils configured to generate a first magnetic field and a first plurality of sensor magnetic coils configured to sense the first magnetic field and generate first magnetic sensor data, one of the first plurality of magnetic coils configured to be attached to the first HMD and the other of the first plurality of magnetic coils configured to be attached to a limb of the first user;
   a second magnetic tracking system comprising a second plurality of source magnetic coils configured to generate a second magnetic field and a second plurality of sensor magnetic coils configured to sense the second magnetic field and generate second magnetic sensor data, one of the second plurality of magnetic coils configured to be attached to the second HMD and the other of the second plurality of magnetic coils configured to be attached to a limb of the second user; and
   a processor configured to:
      generate and output instructions to the first HMD to display on the first HMD a virtual world;
      generate and output instructions to the second HMD to display on the second HMD the virtual world;
      determine a relative position and orientation of the first users' limb relative to the first HMD using the first magnetic sensor data from the first magnetic tracking system;
      determine an absolute position and orientation of the first user's limb relative to the fixed position in the physical world by combining the relative position and orientation of the first user's limb with the absolute position and orientation of the first HMD;
      determine a relative position and orientation of the second user's limb relative to the second HMD using the second magnetic sensor data from the second magnetic tracking system;
      determine an absolute position and orientation of the second user's limb relative to the fixed position in the physical world by combining the relative position and orientation of the second user's limb with the absolute position and orientation of the second HMD;
      generate and output instructions to the first HMD to display on the first HMD a first virtual limb in the virtual world, the first virtual limb in an apparent position and orientation corresponding to the determined absolute position and orientation of the first user's limb;
      generate and output instructions to the second HMD to display on the second HMD a second virtual limb in the virtual world, the second virtual limb in an apparent position and orientation corresponding to the determined absolute position and orientation of the second user's limb;
      generate and output instructions to the first HMD to display on the first HMD the second virtual limb in the virtual world, the second virtual limb in an apparent position and orientation corresponding to the determined absolute position and orientation of the second user's limb;
      and
      generate and output instructions to the second HMD to display on the second HMD the first virtual limb in the virtual world, the first virtual limb in an apparent position and orientation corresponding to the determined absolute position and orientation of the first user's limb.

2. The self-relative tracking system of claim 1 wherein:
the other of the first plurality of magnetic coils configured to be attached to a limb of the first user is contained in a first tracking device configured to be attached to a limb of the first user; and,
the other of the second plurality of magnetic coils configured to be attached to a limb of the second user is contained in a second tracking device configured to be attached to a limb of the second user.

3. The self-relative tracking system of claim 1 wherein:
the other of the first plurality of magnetic coils configured to be attached to a limb of the first user is contained in a controller configured to be held by the first user; and,
the other of the second plurality of magnetic coils configured to be attached to a limb of the second user is contained in a controller configured to be held by the second user.

4. The self-relative tracking system of claim 1 wherein:
the processor, configured to determine the absolute position and orientation of the first user's limb relative to the fixed position in the physical world by combining the relative position and orientation of the first user's limb with the absolute position and orientation of the first HMD, uses an offset between a position of the one of the first plurality of magnetic coils configured to be attached to the first HMD and the absolute position of the first HMD.

5. The self-relative tracking system of claim 1 wherein:
the processor, configured to determine the absolute position and orientation of the second user's limb relative to the fixed position in the physical world by combining the relative position and orientation of the second user's limb with the absolute position and orientation of the second HMD, uses an offset between a position of the one of the second plurality of magnetic coils configured to be attached to the second HMD and the absolute position of the second HMD.

6. The self-relative tracking system of claim 1 wherein the first plurality of source magnetic coils configured to generate the first magnetic field is the one of the first plurality of magnetic coils configured to be attached to the first HMD, and the first plurality of sensor magnetic coils configured to sense the first magnetic field and generate first magnetic sensor data is the other of the first plurality of magnetic coils configured to be attached to the limb of the first user.

7. The self-relative tracking system of claim 1 wherein the second plurality of source magnetic coils configured to generate the second magnetic field is the one of the second plurality of magnetic coils configured to be attached to the limb of the second user, and the second plurality of sensor magnetic coils configured to sense the second magnetic field and generate second magnetic sensor data is the other of the second plurality of magnetic coils configured to be attached to the second HMD.

8. The self-relative tracking system of claim 1 wherein the first HMD tracking system comprises an optical tracking system.

9. The self-relative tracking system of claim 1 wherein the second HMD tracking system comprises an optical tracking system.

10. The self-relative tracking system of claim 1 wherein the first HMD tracking system comprises an inertial measurement unit.

11. The self-relative tracking system of claim 1 wherein the second HMD tracking system comprises an inertial measurement unit.

12. The self-relative tracking system of claim 1 wherein the first HMD tracking system comprises a third magnetic tracking system comprising:
   a third plurality of source magnetic coils configured to generate a third magnetic field; and
   a third plurality of sensor magnetic coils configured to sense the third magnetic field and generate third magnetic sensor data; and
   wherein one of the third pluralities of magnetic coils is configured to be attached to the first HMD and the other one of the third plurality of magnetic coils is configured to be attached to the fixed, physical world, position.

13. The self-relative tracking system of claim 1 wherein the second HMD tracking system comprises a third magnetic tracking system comprising:
   a third plurality of source magnetic coils configured to generate a third magnetic field; and
   a third plurality of sensor magnetic coils configured to sense the third magnetic field and generate third magnetic sensor data; and
   wherein one of the third pluralities of magnetic coils is configured to be attached to the second HMD and the other one of the third plurality of magnetic coils is configured to be attached to the fixed, physical world, position.

* * * * *